Patented May 29, 1923.

1,457,097

UNITED STATES PATENT OFFICE.

EUGENE R. WHITMORE, OF THE UNITED STATES ARMY.

VACCINE AND METHOD OF PREPARING SAME.

No Drawing.　　　Application filed March 8, 1919.　Serial No. 281,474.

*To all whom it may concern:*

Be it known that I, EUGENE R. WHITMORE, United States Army, a citizen of the United States, residing at Lancaster, in the county of Grant and State of Wisconsin, have invented certain new and useful Improvements in Vaccines and Methods of Preparing Same, of which the following is a specification.

This invention or discovery pertains to vaccines and like preparations, such as are used in prophylactic treatment of human beings and dumb animals; and it consists, first, in a treatment of bacteria or other microorganisms, or of material containing them, whereby the living organisms are rendered capable of being kept for considerable periods of time in a state of suspended animation or arrested development, ready for immediate use, or for further and final treatment if such be necessary in any case to their incorporation in or their use as the active agent of vaccines of more complex character.

It consists, secondly, in vaccines and similar preparations produced by such treatment of the organisms, with or without further preparation, or admixture of other ingredients or vehicle.

In the employment of vaccines, lymphs, lotions, and the like, it is generally recognized that use therein of the living organism insures the better or more efficient product; but methods heretofore devised for insuring stability of such preparations have not proven generally satisfactory or effective. While vaccines, lymphs, lotions, etc., containing living microorganisms have been used to a considerable extent in veterinary work, and to some extent in the prophylactic treatment of human beings, the instability of such preparations has precluded the general acceptance of those containing living organisms.

The primary object, therefore, of the present invention or discovery is the stabilization of the product, or in other words, such treatment or preparation as shall result in the production of vaccines, lymphs, lotions, etc., in which living microorganisms brought to the proper condition for use, may be held for a quite considerable period of time or indefinitely, in a dormant state, though capable of becoming active when the preparations are employed in the usual manner.

Thus far the method or process has chiefly been tested and practically used with the pneumococcus, in the preparation of vaccines for protection against pneumonia, and such use has been chiefly for the immunization of dumb animals. This is due to the fact that safety dictates thorough tests with considerable time for observation of results and effects, before risking human life.

Experiments and tests made indicate that the same or similar treatment employed with the pneumococcus is applicable to other bacteria or microorganisms, and the anthrax bacillus is especially in view in this connection. It will of course be understood that in applying the process or method, the periods of time, degrees of heat, strength of chemicals, and like matters, will or may vary with the different bacteria or organisms, according to their well known and characteristic differences.

In the main or up to the final step in the preparation of the stable mixture, the treatment follows or may follow present practice, the prominent or essential feature of the invention residing in the grinding of the living organisms in a dried state, in oil, preferably a vegetable oil, which for the attainment of best results should be neutral, sterile, and anhydrous.

In order that others may practically carry out the method or process, the preferred procedure may be stated as follows:

1. The bacteria or other micro-organisms may be grown either on a solid medium, such as agar, or in any usual liquid medium suitable to their propagation, such as a broth.

2. When grown on a solid medium such as agar, and properly developed, they may be washed off with a physiological salt solution or other suitable solution, or may be taken off with the aid of a vacuum suction collector, or in any other usual way.

3. The bacteria or other organisms thus removed from the solid medium or present in the liquid medium, may be attenuated if desired, by heat, cold, chemicals, or dilution; by sensitization, or mixture with serum; or in any of the usual ways familiar to bacteriologists. Such attenuation will not, however, be necessary in all cases, but if effected must be governed as to temperature, strength and character of chemicals, extent of dilution or the like, according to the particular bacteria or micro-organisms, that is according to the genus and species of living organisms, under treatment, and according to the varying conditions in which different lots or cultures of such organisms occur. These conditions vary quite widely, as is well understood, and require corresponding variation in the treatment, such variations being matter of general knowledge to those familiar with the subject. Obviously, the degree of heat and the time for which it is maintained, the strength of chemicals employed, and generally, the intensity of treatment, must of course be kept always within such limits as shall not destroy the life of the microorganisms treated. These limitations are well known for many species of bacteria and other micro-organisms and hence may readily be observed by intelligent users of the process.

4. Sedimentation is then effected by centrifugation or otherwise, preferably by means of a continuous feed centrifuge.

5. The sediment is collected, preferably frozen and dried, usually in vacuo, using a desiccant; and a weighed amount of the material is then taken for further treatment.

Drying may, however, be effected above a freezing temperature, at atmospheric pressure, and without a desiccant.

6. The dried material is ground in lanolin or other lipoid, to aid emulsification and to lessen toxicity. Any suitable grinding means may be used, though special grinding jars employing steel balls are found advantageous.

Up to this point the treatment is that commonly followed.

7. The lipoid mixture produced by the treatment thus far stated is next ground in a suitable oil, preferably a vegetable oil.

This step constitutes the main and essential feature of my invention. The purpose of grinding the micro-organisms in oil is to discrete or segregate the living cells, and to cause each individual cell to be enveloped in a film of oil.

The oil should be neutral, sterile and anhydrous, in order to insure best results.

Neutralization of the oil may be effected by any of the known methods usually employed for this purpose.

Sterilization may be effected by heat, moist or dry; by the use of ultraviolet rays; or otherwise.

Dehydration of the oil may be effected by dry heat (not materially above or below 105° C.), with or without a current of carbon dioxid or other gas; or by the use of anhydrous sodium sulphate, or calcium chlorid, or other suitable agent.

As a concrete example I may state in brief terms the formula as applied to the anthrax bacillus in the preparation of vaccines for treatment of anthrax:

Anthrax bacilli are attenuated in the usual way by growing in broth at a temperature of 42.5° C. or thereabout; they are then separated out by centrifugation, preferably with a continuous feed centrifuge; next frozen; then dried; weighed; ground up in anhydrous lanolin; and finally ground in neutral, sterile, anhydrous cotton seed oil.

So prepared the living organisms may be kept for long periods of time without change of virulence or breaking down, maintaining their living condition, but without further propagation, increase, or other change. The period of time during which this dormant or torpid condition, or state of arrested development or suspended animation, may be continued, cannot be definitely given, but it is known to last for a year or more, and it is believed will obtain for several years.

Vegetable oils are preferably used because it is found that with neutral animal oils there is danger of the oil breaking down or becoming rancid, even though kept cold, dry, and in darkness, whereas cotton seed oil and other vegetable oils are free from this drawback. Cotton seed oil is readily obtainable, and at moderate cost. Mineral oils are unsatisfactory because not readily or perfectly absorbed.

Variations may be made in the process or treatment. Thus, for instance:

(a) Material containing microorganisms may be frozen and dried, then attenuated, and carried through the different stages or operations above enumerated except that sedimentation is omitted.

(b) The process may be as first above described except for the omission of the lipoid used in the first grinding operation.

(c) Freezing may be omitted.

Other minor variations may be made without departing from the spirit or scope of my invention. The purpose of freezing is that it enables the drying to be effected without killing the bacteria or other micro-organisms. Such freezing is not absolutely essential but it is the best known means of effecting drying without killing the organisms.

The term "vaccine" is used throughout this description and in the claims which follow, in a generic or comprehensive sense, and includes vaccines, lymphs, and lotions generally, in which bacteria or microorganisms are incorporated.

The term "microorganisms" is used to include those organisms which are not at this time definitely or positively known to be bacteria, or are not generally classed as such, as also those which are known not to be bacterial. Among these may be noted the higher fungi or molds, the smallpox and rabies viruses, certain unicellular animal parasites, and the like. The invention or discovery comprehends various micro-organisms to whatever extent they may be incorporated into vaccines, lymphs, lotions, and similar preparations, in a living state, and stabilized or kept for indefinite periods in the live state, without propagation, increase, or other change of state or condition. For brevity the term micro-organisms will be used in the claims as comprehending both bacterial and other living organisms of the classes indicated.

Having thus described my invention what I claim is:—

1. The method of preparing living micro-organisms for use in vaccines and like preparations, which consists in propagating the organisms; attenuating and sedimenting the same; drying; and finally, grinding in oil to discrete or separate and individually coat with oil the cells or organisms.

2. The method of preparing living micro-organisms for use in vaccines and like preparations, which consists in propagating the organisms; attenuating and sedimenting the same; freezing; drying; grinding in anhydrous lipoid; and finally, grinding in neutral, sterile, anhydrous oil to discrete or separate without killing the living cells or organisms, and to individually coat them with and suspend them in the oil.

3. As a step in the treatment of living micro-organisms for use in the preparation of vaccines and the like, grinding the same in neutral, sterile, anhydrous oil, and thereby coating individual cells or organisms with and suspending them in the oil.

4. As a step in the treatment of living micro-organisms for their preservation in a state of suspended animation or arrested development, grinding the same in neutral, sterile, anhydrous vegetable oil, and thereby coating individual cells or organisms with and suspending them in the oil.

5. The step in the treatment of living micro-organisms for their preservation without change of virulence or breaking down, which consists in grinding the same in neutral, sterile, anhydrous cotton seed oil, and thereby coating individual cells or organisms with and suspending them in the oil.

6. A vaccine or like preparation comprising living micro-organisms suitably prepared, suspended in anhydrous, neutral, vegetable oil.

7. A vaccine or like preparation comprising living micro-organisms suitably prepared, discreted and suspended in neutral, sterile, anhydrous oil.

8. The herein described preparation consisting of suitably prepared living micro-organisms, discreted, suspended in, and completely enveloped by, neutral, sterile, anhydrous cotton-seed oil.

9. A vaccine or like preparation consisting of living anthrax bacilli suitably prepared, discreted, and suspended in neutral, sterile, vegetable oil.

In testimony whereof I have signed my name to this specification.

EUGENE R. WHITMORE.